(12) United States Patent
Nakane

(10) Patent No.: US 6,466,379 B2
(45) Date of Patent: Oct. 15, 2002

(54) LENS BARREL

(75) Inventor: Takeshi Nakane, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/017,010

(22) Filed: Dec. 14, 2001

(65) Prior Publication Data

US 2002/0141074 A1 Oct. 3, 2002

(30) Foreign Application Priority Data

Mar. 30, 2001 (JP) ........................................ 2001-101497

(51) Int. Cl.[7] ............................ G02B 15/14; G02B 7/02; G03B 17/00
(52) U.S. Cl. ...................... 359/699; 359/694; 359/700; 359/705; 359/822; 359/826; 396/72; 396/85; 396/87; 396/79
(58) Field of Search .................... 359/694, 699, 359/700, 701, 704, 705, 706, 826, 824; 396/72, 85, 87, 451, 462, 79

(56) References Cited

U.S. PATENT DOCUMENTS

| 4,255,020 A | * | 3/1981 | Yukio | 359/705 |
|---|---|---|---|---|
| 4,318,593 A | * | 3/1982 | Tsuji et al. | 359/699 |
| 5,166,829 A | * | 11/1992 | Iizuka | 359/699 |
| 5,291,232 A | * | 3/1994 | Kobayashi et al. | 396/87 |
| 5,633,763 A | * | 5/1997 | Suzuki et al. | 359/822 |
| 5,699,200 A | * | 12/1997 | Uno et al. | 359/700 |
| 5,771,409 A | * | 6/1998 | Nishimura | 396/72 |
| 5,892,988 A | * | 4/1999 | Uno | 396/72 |
| 6,069,745 A | * | 5/2000 | Fujii et al. | 359/694 |
| 6,115,191 A | | 9/2000 | Ito et al. | |
| 6,268,970 B1 | | 7/2001 | Ito et al. | |

FOREIGN PATENT DOCUMENTS

JP 11-064714 A 3/1999

* cited by examiner

Primary Examiner—Loha Ben
(74) Attorney, Agent, or Firm—Frishauf, Holtz, Goodman & Chick, P.C.

(57) ABSTRACT

A lens barrel of the present invention includes a first zoom frame and a second zoom frame which are moved frontward and rearward by a cam frame. The first zoom frame holds a first lens group, and the second zoom frame contacts and presses a second-group frame. Four guide shafts are fixed to the first zoom frame, and directly and slidably support the second-group frame which holds a second lens group or a third-group frame which holds a third lens group. Therefore, the deviation between the optical axes of the second lens group and the third lens group from the first lens group is reduced. In the lens barrel, the supporting structure of the frame members is simplified, the supporting accuracy of the frame members is increased, and the misalignment of the optical axes of the lens groups is prevented.

15 Claims, 2 Drawing Sheets

LENS BARREL

This application claims benefit of Japanese Application No. 2001-101497 filed in Japan on Mar. 30, 2001, the contents of which are incorporated by this reference.

BACKGROUND OF THE INVENTION

1. Field of the Invention

The present invention relates to the structure of frontward and rearward movable frame members which constitute a lens barrel.

2. Related Art Statement

A zoom lens barrel disclosed in Japanese Unexamined Patent Application Publication No. 11-64714 concerning the configuration of a lens barrel includes a first-group tube for supporting a first lens group, and a second-group tube for supporting a second lens group (focusing lens). The first-group tube is supported by a cam frame, and the second-group tube is supported by a zoom tube via a guide shaft. The zoom tube is supported by the cam frame.

In the above zoom lens barrel, multiple supporting members, such as the first-group tube, the cam frame, the zoom tube, and the guide shaft, are interposed between the first lens group and the second lens group, as described above. Therefore, a deviation between optical axes of the first lens group and the second lens group may increase, and this makes it difficult to achieve a high optical performance.

SUMMARY OF THE INVENTION

The present invention has been made to overcome the above problems, and an object of the invention is to provide a lens barrel with a simple configuration in which frame members are supported with high precision and in which a deviation between the optical axes of lens groups is reduced.

In order to achieve the above object, according to an aspect of the present invention, there is provided a lens barrel having a plurality of lens groups including at least a first lens group and a second lens group which are movable, along an optical axis, and also comprising a cam frame having a first cam and a second cam for driving the first, lens group and the second lens group along the optical axis during a zooming operation, a first moving frame which holds the first lens group and is driven along the optical axis by the first cam, a second moving frame which is driven along the optical axis by the second cam, a third moving frame which holds the second lens group and is supported by the first moving frame so that it can move along the optical axis relative to the first moving frame, and a driving device mounted in the second moving frame so as to drive the third moving frame relative to the first moving frame and the second moving frame along the optical axis.

According to another aspect of the present invention, there is provided a lens barrel having a plurality of lens groups including at least a first lens group, a second lens group, and a third lens group which are movable along an optical axis, and also comprising a first-lens-group moving frame which holds the first lens group, a first and a second guide members formed in the first-lens-group moving frame so as to extend along the optical axis, a second-lens-group moving frame which holds the second lens group and which is guided slidably only along the optical axis relative to the first-lens-group moving frame while the positional accuracy of the second lens group with respect to the optical axis of the first lens group is ensured to be within a predetermined range by the first guide member, and a third-lens-group moving frame which holds the third lens group and which is guided slidably only along the optical axis relative to the first-lens-group moving frame while the positional accuracy of the third lens group with respect to the optical axis of the first lens group is ensured to be within a predetermined range by the second guide member.

Further objects, features, and advantages of the present invention will become apparent from the following description of the preferred embodiments with reference to the attached drawings.

DETAILED DESCRIPTION OF THE PREFERRED EMBODIMENTS

An embodiment of the present invention will be described below with reference to the attached drawings.

Figure 1:
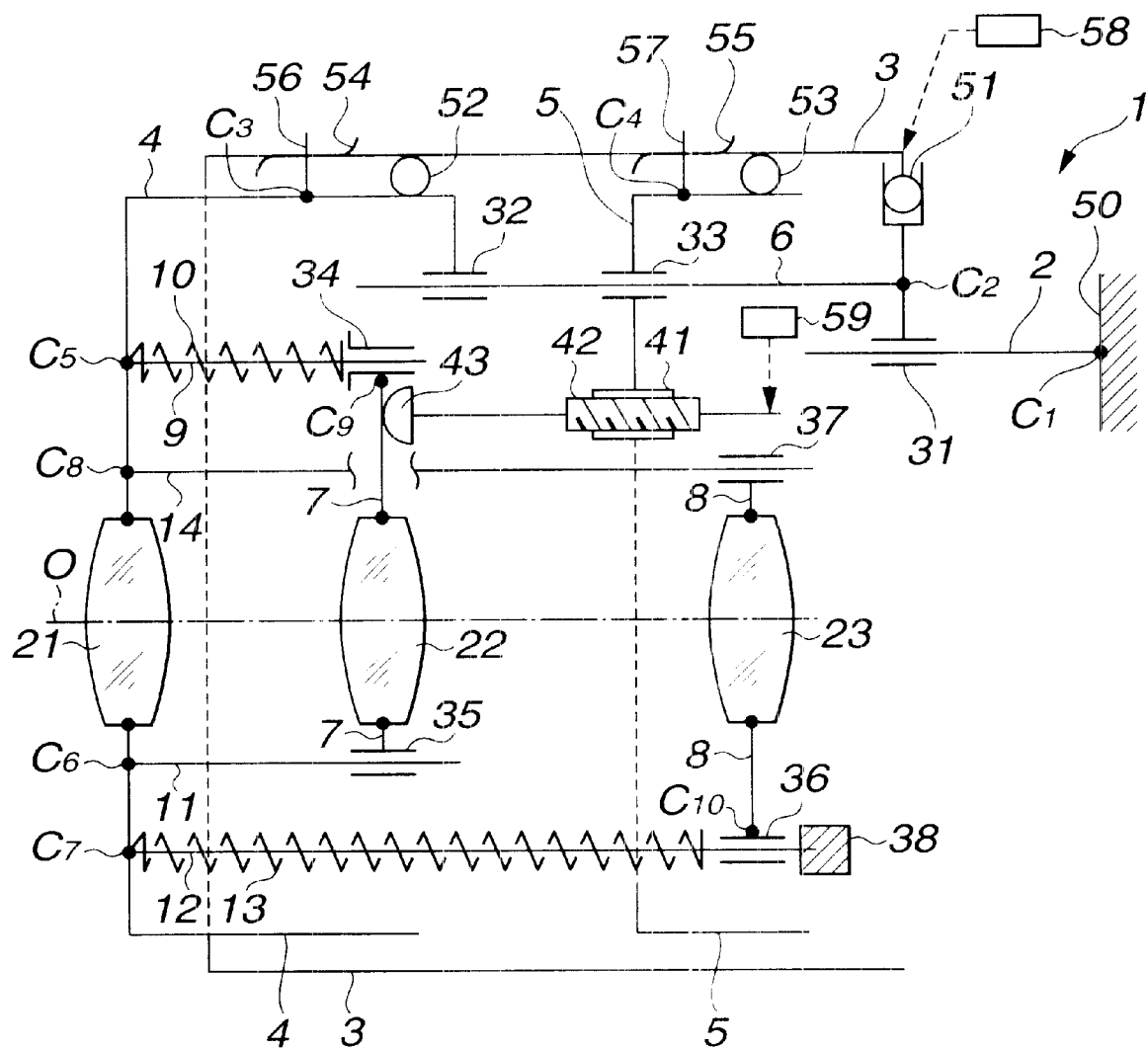
FIG. 1 is a schematic view showing the configuration of a zoom lens barrel serving as a lens barrel according to an embodiment of the present invention.
Figure 2:
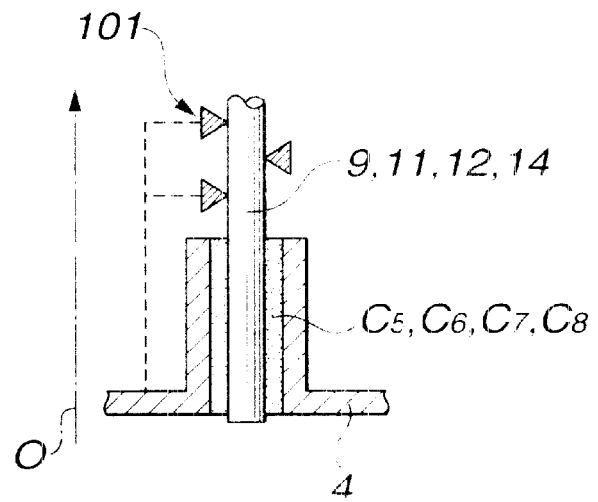
FIG. 2 is a sectional view showing a state in which a guide shaft is fixedly bonded to a zoom frame in the zoom lens barrel shown in FIG. 1.
Figure 3:
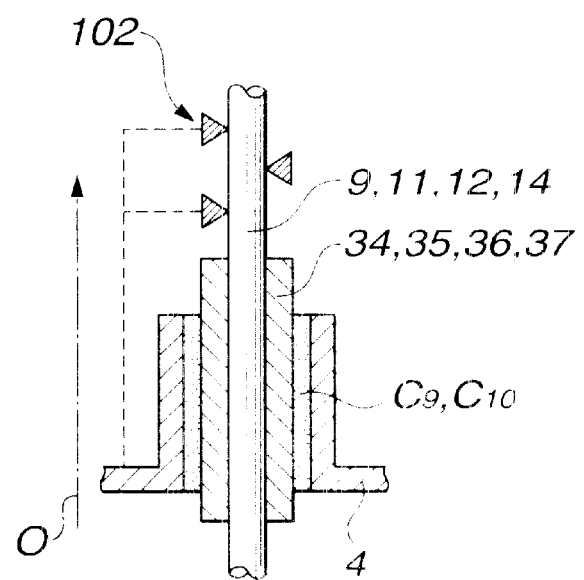
FIG. 3 is a sectional view showing a state in which a sleeve is fixedly bonded to a second-group frame or a third-group frame in the zoom lens barrel shown in FIG. 1.

FIG. 1 is a schematic view showing the configuration of a zoom lens barrel serving as a lens barrel according to an embodiment of the present invention, FIG. 2 is a sectional view showing a state in which a guide shaft is fixedly bonded to a zoom frame in the zoom lens barrel shown in FIG. 1, and FIG. 3 is a sectional view showing a state in which a sleeve having the guide shaft slidably fitted therein is fixedly bonded to the zoom frame in the zoom lens barrel. In the following description, the object side is designated the front side, and the image formation side is designated the rear side.

A zoom lens barrel 1 principally comprises a fixed frame 50 having a linear guide 2, a cam frame 3 serving as a cam member, a first zoom frame 4 serving as a first moving frame (frame member) which holds a first lens group 21, a second zoom frame 5 serving as a second moving frame (frame member), a linear key member 6 which moves linearly, a second-group frame 7 serving as a third moving frame which holds a second lens group 22, and a third-group frame 8 serving as a fourth moving frame (frame member) which holds a third lens group 23. In the figures, C1 to C10 denote portions where the components are fixed.

The cam frame 3 comprises a portion 51 which rotationally slides on the linear key member 6, portions 52 and 53 which rotationally slide on the first zoom frame 4 and the second zoom frame 5, respectively (more specifically, a fitting portion between the inner peripheral surface of the cam frame 3 and the outer peripheral surface of the zoom frame 4, and a fitting portion between the inner peripheral surface of the cam frame 3 and the second zoom frame 5), a first cam 54, and a second cam 55. The cam frame 3 is rotationally driven by a cam-frame driving mechanism 58 so that it moves frontward and rearward relative to the fixed frame 50 between a collapsed position and a picture-taking position, and further it rotates at the picture-taking position so as to perform a zooming operation.

The linear key member 6 is supported slidably along an optical axis O by the linear guide 2 of the fixed frame 50 the linear key member 6 is engaged with the rotational sliding portion 51 of the cam frame 3, it moves frontward and rearward along the optical axis O together with the cam frame 3.

The first zoom frame 4 includes a peripheral sliding portion which is slidably fitted in the rotational sliding portion 52 of the cam frame 3, a cam follower 56 fixed to the peripheral sliding portion, and a linear guide portion 32 slidably engaged with the linear key member 6.

The second zoom frame 5 includes a peripheral sliding portion slidably fitted in the rotational sliding portion 53 of the cam frame 3, a cam follower 57 fixed to the peripheral sliding portion, and a linear guide portion 33 slidably engaged with the linear key member 6.

The cam followers 56 and 57 are respectively fitted to the first cam 54 and the second cam 55 of the cam frame 3. When the cam frame 3 rotates, the first zoom frame 4 and the second zoom frame 5 are moved frontward and rearward along the optical axis O with the rotation thereof regulated by the linear key member 6.

Guide shafts 9 and 11 serving as sticklike guide members for movably supporting the second-group frame 7, and guide shafts 12 and 14 serving as sticklike guide members for movably supporting the third-group frame 8 along the optical axis O are fixed to the first zoom frame 4 in parallel with the optical axis O.

When fixed to the first zoom frame 4, as shown in FIG. 2, the guide shafts 9, 11, 12, and 14 are inserted into guide-shaft holding holes C5, C6, C7, and C8 serving as fixing portions of the first zoom frame 4 with a clearance therein, and are supported together with the first zoom frame 4 by an assembly jig 101. The guide shafts are held in parallel with the optical axis O while the positional accuracy thereof with respect to the optical axis of the first lens group 21 is ensured. An adhesive is applied into the clearance with the positional accuracy maintained, so that the first zoom frame 4 and the guide shafts are bonded to each other.

The second-group frame 7 is supported slidably along the optical axis O by the guide shaft 9 and the guide shaft for preventing the rotation 11. The guide shaft 9 is slidably fitted in a sleeve 34 fixed to the second-group frame 7, and the guide shaft 11 is slidably engaged with an antirotation portion 35 of the second-group frame 7. A second-group spring 10 made of a compression spring for serving as a forcing member is fitted on the guide shaft 9. The second-group frame 7 is constantly forced rearward by the force of the second-group spring 10.

When fixed to the second-group frame 7, the sleeve 34 is inserted into a sleeve-holding hole C9 serving as a fixing portion of the second-group frame 7 with a clearance therein, and the second-group frame 7 and the guide shaft 9 fitted in the sleeve 34 are supported by an assembly jig 102, as shown in FIG. 3. The sleeve 34 is held with a predetermined accuracy at a predetermined position relative to the optical axis of the second lens group 22 of the second-group frame 7 in parallel therewith. An adhesive is applied into the clearance in the sleeve 34 in the above holding state, so that the sleeve 34 and the second-group frame 7 are bonded to each other.

The third-group frame 8 is supported slidably along the optical axis O by the guide shaft 12 and the guide shaft 14 for preventing the rotation. The guide shaft 12 slidably supports a sleeve 36 fixed to the third-group frame 8, and the guide shaft 14 slidably supports an antirotation portion 37 of the third-group frame 8. A third-group spring 13 made of a compression spring for serving as a forcing member is fitted on the guide shaft 12. The third-group frame 8 is constantly forced rearward by the force of the third-group spring 13.

When fixed to the third-group frame 8, the sleeve 36 is inserted into a sleeve-holding hole C10 serving as a fixing portion of the third-group frame 8 with a clearance therein, and the third-group frame 8 and the guide shaft 12 fitted in the sleeve 36 are supported by the assembly jig 102, as shown in FIG. 3. The sleeve 36 is held with a predetermined accuracy at a predetermined position relative to the optical axis of the third lens group 23 of the third-qroup frame 8 in parallel therewith. An adhesive is applied into the clearance in the sleeve 36 in the above holding state, so that the sleeve 36 and the third-group frame 8 are bonded to each other.

The second zoom frame 5 has a nut portion 41 formed along the optical axis O, and a feed screw 42, which is rotationally driven by a focus driving section 59 incorporated in the second zoom frame 5, is screwed in the nut portion 41. A distal end portion 43 of the feed screw 42 is in contact with the second-group frame 7 in the optical axis direction.

The cam frame 3 rotates, the second zoom frame 5 is moved frontward and rearward in the optical axis direction by the second cam 55. With the frontward and rearward movement, the second-group frame 7 is pressed by the feed screw distal end portion 43, and is moved frontward and rearward against the force of the second-group spring 10. During the focusing operation, the feed screw 42 is rotationally driven by the focus driving section 59, and the second-group frame 7 is pressed against the force of the second-group force 10, thereby performing the focusing operation.

When the zoom lens barrel 1 with the above-described configuration is placed in a picture-taking position, the third-group frame 8 is pressed rearward relative to the first zoom frame 4 by the force of the third-group spring 13, and the sleeve 36 is held in contact with a stopper 38 formed at one end of the guide shaft 12.

When the zoom lens barrel 1 is placed in the collapsed position, the cam frame 3, the first zoom frame 4, and the second zoom frame 5 are retracted into the fixed frame 50 via the first and second cams 54 and 55 by the rotation of the cam frame 3. The second-group frame 7 and the third-group frame 8 are moved forward closer to the first zoom frame 4 in the optical axis direction by a contact member (not shown), by which the second-group frame 7 and the third-group frame 8 are pressed, thereby compressing the springs 10 and 13.

In order to move the zoom lens barrel 1 from the collapsed position to the picture-taking wide-angle position, the cam frame 3 is rotationally driven by the cam-frame driving mechanism 58, and the first zoom frame 4 is moved forward to the wide-angle position by the first cam 54. In this case, the third-group frame 8 is also moved forward in contact with the stopper 38 while being forced rearward by the third-group spring 13. The second zoom frame 5 is moved forward by the second cam 55, and the second-group frame 7 is pressed and moved forward to the wide-angle position via the distal end portion 43 of the feed screw 42, so that it is placed in a picture-taking state.

In order to perform zooming from the wide-angle position to the telephoto position, the first zoom frame 4, the second-group frame 7, and the third-group frame 8 are moved forward to the telephoto position by rotating the cam frame 3.

For focusing operation, the feed screw 42 is rotated by the focus driving section 59. Then, the distal end portion 43 is shifted by the rotation of the feed screw 42, the second-group frame 7 is shifted by being pressed by the distal end portion 43, and the relative distance between the second-group frame 7 and the first zoom frame 4 is changed, thereby carrying out focusing.

In the above-described zoom lens barel 1 of this embodiment, the guide shafts 9, 11, 12, and 14 are fixed to the first zoom frame 4 for holding the first lens group 21 with a predetermined accuracy. The second-group frame 7 which directly holds the second lens group 22 is slidably supported by the guide shafts 9 and 11, and the third-group frame 8 which directly holds the third lens group 23 is slidably supported by the guide shafts 12 and 14. This makes it possible to achieve a zoom lens barrel with high optical accuracy in which a deviation of the respective optical axis of the second lens group 22 and the third lens group 23 from the optical axis of the first lens group 21 is minimized. Since the second-group frame 7 and the third-group frame 8 are directly supported by the first zoom frame 4, as described above, assembly can be easily performed.

The second-group frame 7 and the third-group frame 8 are not directly driven by the cam frame 3, but are moved frontward and rearward via the second-zoom frame 5 or the first zoom frame 4. Since vibrations resulting from the driving by the cam frame 3 are not directly transmitted to the second lens group 22 and the third lens group 23, the frontward and rearward movement thereof is made smooth.

Since the focus driving section 59 for driving the second-group frame 7 for focusing is not placed between the first zoom frame 4 and the second-group frame 7, unnecessary components are not placed therebetween, the optical axis of the first lens group 21 and the optical axis of the second lens group 22 are not prone to be displaced from each other, the structure is simplified, and the supporting accuracy is enhanced.

As described above, according to the lens barrel of the present invention, the supporting accuracy of a plurality of lens groups which are movably supported is enhanced, and the structure of the frame members for supporting the lens groups is simplified.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded with the broadest interpretation so as to encompass all such modifications and equivalent structures and functions.

What is claimed is:

1. A lens barrel having a plurality of lens groups including at least a first lens group and a second lens group which are movable along an optical axis, said lens barrel comprising:
    a cam frame having a first cam and a second cam for driving said first lens group and said second lens group along the optical axis during a zooming operation;
    a first moving frame which holds said first lens group and is driven along the optical axis by said first cam;
    a second moving frame which is driven along the optical axis by said second cam;
    a third moving frame which holds said second lens group and is supported by said first moving frame so that it can move relative to said first moving frame along the optical axis; and
    a driving device mounted in said second moving frame so as to drive said third moving frame relative to said first moving frame and said second moving frame along the optical axis.

2. The lens barrel according to claim 1, wherein said driving device performs focus driving.

3. The lens barrel according to claim 2, wherein said third moving frame is driven by said cam frame so as to move together with said second moving frame along the optical axis during said zooming operation, and is driven by said driving device so as to move relative to said second moving frame along the optical axis during a focusing operation.

4. The lens barrel according to claim 2, further comprising:
    a fourth moving frame which holds a third lens group and is supported by said first moving frame so as to move relative to said first moving frame along the optical axis.

5. The lens barrel according to claim 4, wherein said first moving frame, said second moving frame, and said fourth moving frame are driven by said cam frame so as to move along the optical axis and said third moving frame is driven so as to move together with said second moving frame along the optical axis during said zooming operation, and only said third moving frame is driven by said driving device so as to move relative to said second moving frame along the optical axis during a focusing operation.

6. The lens barrel according to claim 4, wherein said fourth moving frame is supported by a sticklike guide member formed in said first moving frame so as to be movable along the optical axis.

7. The lens barrel according to claim 1, wherein said third moving frame is supported by a sticklike guide member formed in said first moving frame so as to be movable along the optical axis.

8. The lens barrel according to claim 1, further comprising:
    a forcing member for urging said third moving frame supported movably along the optical axis by said first moving frame so that said third moving frame is constantly in contact with said driving device.

9. The lens barrel according to claim 1, wherein said driving device includes a driving source, and a contact member which is shifted along the optical axis by said driving source and is in contact with said third moving frame in order to drive said third moving frame along the optical axis, and said lens barrel further comprises;
    a forcing member for urging said third moving frame, which is supported movably along the optical axis by said first moving frame, along the optical axis so that said third moving frame is constantly in contact with said contact member of said driving device.

10. The lens barrel according to claim 9, wherein said driving source is fixed to said second moving frame.

11. A lens barrel having a plurality of lens groups including at least a first lens group and a second lens group which are movable along an optical axis, said lens barrel comprising:
    a first moving frame which holds said first lens group;
    a second moving frame;
    a third moving frame which holds said second lens group;
    a guide member formed in said first moving frame so as to support said third moving frame slidably along the optical axis; and
    a driving device formed in said second moving frame so as to drive said third moving frame relative to said first moving frame and said second moving frame along the optical axis.

12. The lens barrel according to claim 11, wherein said driving device includes a driving source, and a contact member which is shifted along the optical axis by said driving source and is in contact with said third moving frame in order to drive said third moving frame along the optical axis, and said lens barrel further comprises;

a forcing member for urging said third moving frame supported by said guide member along the optical axis so that said third moving frame is constantly in contact with said contact member of said driving device.

13. A lens barrel according to claim 12, wherein said driving source is fixed to said second moving frame.

14. A lens barrel having a plurality of lens groups including at least a first lens group, a second lens group, and a third lens group which are movable along an optical axis, said lens barrel comprising:

a first-lens-group moving frame which holds said first lens group;

first and second guide members formed in said first-lens-group moving frame so as to extend along the optical axis;

a second-lens-group moving frame which holds said second lens group and which is guided slidably only along the optical axis relative to said first-lens-group moving frame while the positional accuracy of said second lens group with respect to the optical axis of said first lens group is ensured to be within a predetermined range by said first guide member; and a third-lens-group moving frame which holds said third lens group and which is guided slidably only along the optical axis relative to said first-lens-group moving frame while the positional accuracy of said third lens group with respect to the optical axis of said first lens group is ensured to be within a predetermined range by said second guide member.

15. The lens barrel according to claim 14, further comprising:

another moving frame different from said first-lens-group moving frame, said second-lens-group moving frame, and said third-lens-group moving frame;

a cam frame having a first cam to be engaged with a cam follower formed in said first-lens-group moving frame in order to move said first-lens-group moving frame along the optical axis during a zooming operation, and a second cam to be engaged with a cam follower formed in said another moving frame in order to drive said another moving frame along the optical axis; and a driving device formed in said another moving frame so as to move said second-lens-group moving frame relative to said first-lens-group moving frame and said another moving frame along the optical axis, wherein said first-lens-group moving frame, said second-lens-group moving frame, and said third-lens-group moving frame are driven by said cam frame so as to move along the optical axis and said another moving frame is driven so as to move together with said second-lens-group moving frame along the optical axis during the zooming operation, and said another moving frame is driven by said driving device so as to move relative to said second-lens-group moving frame along the optical axis during a focusing operation.

* * * * *